United States Patent
Sihvola

(10) Patent No.: US 7,444,252 B2
(45) Date of Patent: Oct. 28, 2008

(54) LINEARIZER CIRCUIT

(75) Inventor: Esa Sihvola, Espoo (FI)

(73) Assignee: Micro Analog Systems OY, Espoo (FI)

( * ) Notice: Subject to any disclaimer, the term of this patent is extended or adjusted under 35 U.S.C. 154(b) by 163 days.

(21) Appl. No.: 11/429,222

(22) Filed: May 8, 2006

(65) Prior Publication Data

US 2006/0255780 A1   Nov. 16, 2006

(30) Foreign Application Priority Data

May 10, 2005   (FI)   ................................ 20055218

(51) Int. Cl.
  *G01D 18/00*   (2006.01)
  *G01R 27/00*   (2006.01)
  *G05F 1/00*   (2006.01)
(52) U.S. Cl. .................... 702/86; 323/273; 324/658
(58) Field of Classification Search ................ 702/58, 702/72, 86, 106, 107; 323/273, 274; 324/658, 324/686
See application file for complete search history.

(56) References Cited

U.S. PATENT DOCUMENTS

| | | | |
|---|---|---|---|
| 4,831,325 A * | 5/1989 | Watson, Jr. | 324/678 |
| 5,445,031 A | 8/1995 | Benzel | |
| 6,198,296 B1 * | 3/2001 | Ivanov | 324/725 |
| 6,486,643 B2 * | 11/2002 | Liu | 323/268 |
| 2004/0032268 A1 | 2/2004 | Schulte | |

* cited by examiner

*Primary Examiner*—Bryan Bui
(74) *Attorney, Agent, or Firm*—Oliff & Berridge, PLC

(57) ABSTRACT

A linearizer circuit which corrects inherent nonlinearity of a capacitive pressure sensor is provided. The linearizer is based on an operational amplifier configuration including a feedback network of switched capacitor type that is switched between a first switching phase and a second switching phase .In this switched capacitor configuration, DC gain of the operational amplifier configuration in the second switching phase can be adapted to realize a linearization function required to substantially linearize a non-linear capacitance-pressure characteristic of a capacitive pressure sensor when the capacitive pressure sensor is connected to be part of the feedback network.

14 Claims, 3 Drawing Sheets

LINEARIZER CIRCUIT

FIELD OF THE INVENTION

The invention relates to a linearizer circuit which corrects inherent nonlinearity of a capacitive pressure sensor.

BACKGROUND OF THE INVENTION

In variable capacitive transducer or capacitive pressure sensors, capacitance varies with the pressure applied to the sensor and can be detected by an appropriate electronic circuitry. A typical capacitive pressure sensor is highly nonlinear. One example of a capacitance-pressure relation is $$C(p) = C_{00} + kC_0 + \frac{C_0}{1 - \frac{C_0}{\kappa}p} + \frac{aC_0}{1 - \frac{C_0}{b\kappa}p} \quad (1)$$

where $C_{00}$, $C_0$, and $\kappa$ are independent statistical parameters of a capacitive pressure sensor. Parameters k, a, and b are constants for a given sensor type. The applied absolute pressure is p. FIG. 1 shows a capacitance vs. pressure characteristic with parameter values $C_{00}$=0.65 pF, $C_0$=3.25 pF, $\kappa$=4180 kPa*pF, k=0, a=0.808 and b=1.410.

In a pressure measurement system utilizing this kind of capacitive sensor, nonlinearity must be corrected to obtain an output signal proportional to pressure. In other words, the circuit must have some property which realizes the inverse function for the function presented in Equation 1 and FIG. 1. The solution of p from Equation 1 leads to a complex expression involving square root, hardly being feasible from the point of view of circuit design. In any case, a complicated electronic circuitry is required. Even if the capacitance-pressure relation were approximated by an equation simpler than Equation 1, it would still be difficult to design an electronic circuit which outputs signal p(C) when sensor capacitance is C.

DISCLOSURE OF THE INVENTION

An object of the present invention is thus to provide a feasible linearizer circuit for correcting nonlinearity of a capacitive pressure sensor.

The object of the invention is achieved by a linearizer circuit according to the independent claim. Preferred embodiments of the invention are disclosed in the dependent claims.

The present invention is based on an operational amplifier configuration comprising a feedback network of switched capacitor type, clock means for controlling the feedback network of switched capacitor type between a first switching phase and a second switching phase. In such a switched capacitor configuration, dc gain of the operational amplifier configuration in the second switching mode can be adapted to realize a linearization function required to substantially linearize a non-linear capacitance-pressure characteristic of a capacitive pressure sensor when the capacitive pressure sensor is connected to be part of the feedback network. Capacitor values required for capacitance value C of the capacitive pressure sensor can be calculated easily. In an embodiment of the invention, the feedback network of switched capacitor type includes adjustable capacitors for adapting the linearizer circuit to parametric variations among different capacitive pressure sensors. In the circuit configuration according to the present invention, the switched capacitor technique offers a way to implement the required linearizing function for a capacitive pressure sensor with a simple circuit. It also easily realizes a capacitance-to-voltage conversion necessary with a capacitive sensor.

BRIEF DESCRIPTION OF THE DRAWINGS

In the following, the invention will be described in greater detail by means of exemplary embodiments and with reference to the attached drawings, in which.

DETAILED DESCRIPTION OF THE INVENTION

For purposes of describing the exemplary embodiments, the right-hand side expression in Equation 1 can be accurately approximated by a simpler one:

$$C(p) = C_{00} + \frac{C_0 p_0}{p_0 - p}, \quad (2)$$

where C00, C0 and p0 are fitting parameters. Then, solving p from Equation 2, we have $$p(C) = p_0 \left(1 - \frac{C_0}{C - C_{00}}\right) \quad (3)$$
$$= p_0 \frac{C - C_{00} - C_0}{C - C_{00}}$$
$$= \frac{C - C_{00} - C_0}{\frac{C}{p_0} - \frac{C_{00}}{p_0}}.$$

Equation 3 gives a function necessary for linearizing a capacitive pressure sensor. In the following, examples of linearizer circuits of the invention realizing the function of Equation 3 are described.

Figure 1:
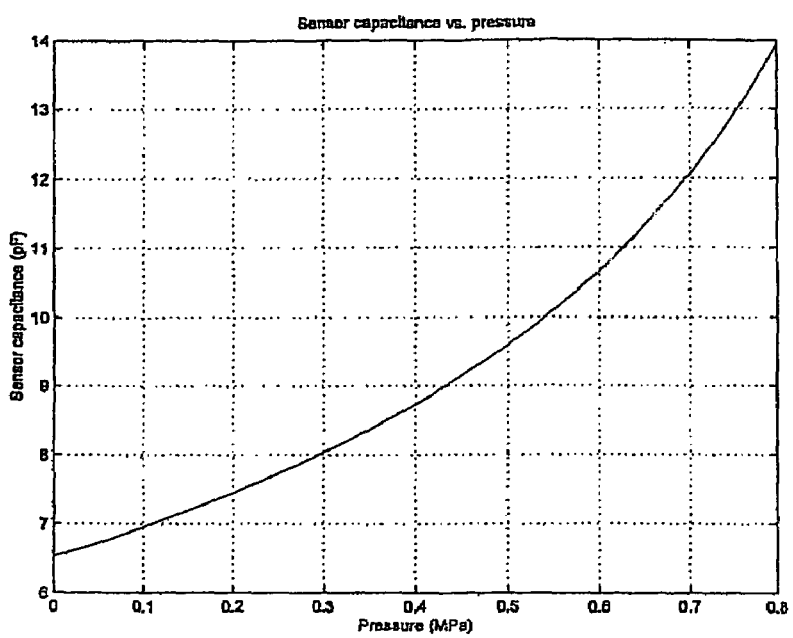
FIG. 1 is a graph showing an example of a capacitance vs. pressure characteristic of a capacitive pressure sensor.
Figure 2:
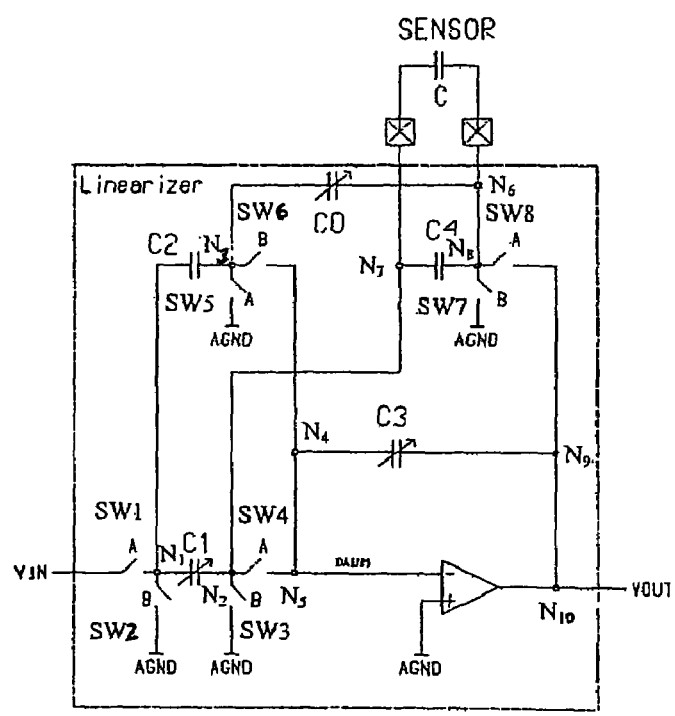
FIG. 2 is a schematic diagram of a circuit according to the present invention.
Figure 3:
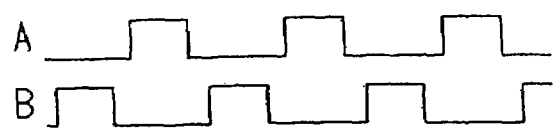
FIG. 3 is a timing diagram showing waveforms of switch control signals A and B.

FIG. 2 is a schematic diagram of a circuit according to the present invention realizing the function of Equation 3. In FIG. 2, the linearizer circuit is constructed using only one operational amplifier A1 and five switched capacitors C0, C1, C2, C3, and C4, as well as sensor capacitance C. Switching devices SW1 to SW8 associated with the capacitors C0 to C4 are controlled by switch control signals A and B. Whenever signal A or B is active, the corresponding switches SW1, SW4, SW5, SW8, or SW2, SW3, SW6, SW7 are closed. Signals A and B must be non-overlapping, i.e. they must never be active at the same time, to prevent any loss of charge in the capacitors and momentarily shortcuts. Waveforms A and B are shown in FIG. 3, where the higher level means an active phase (corresponding switches are closed). Waveforms A and B are running continuously and provided by a specific digital circuit. From now on, the times when A is high are called "clock phase A" and the times when B is high are called "clock phase B". VIN is an input signal, which only needs to be a dc voltage. VOUT is an output signal, which in steady state has a constant value VOUTA in each clock phase A, and another constant value VOUTB in each phase B. AGND is an analog ground, which should be approximately half of the supply voltage.

In switch phase A, a first terminal N1 of the capacitor C1 is switched to an input voltage VIN by the switch SW1, and a second terminal N2 of the capacitor C1 is switched to a node N5 and thereby to an inverting input OAINM of the operational amplifier A1 by the switch SW4. A first terminal of the capacitor C2 is connected to a node N1, and a second terminal N3 is switched to the AGND by the switch SW5. A first terminal of the capacitor C0 is connected to a node N3, and a second terminal N6 is connected to an output N10 of the operational amplifier A1 by the switch SW8. A first terminal N4 of the capacitor C3 is connected to the inverting input of the operational amplifier A1, and a second terminal N9 is connected to the output N10. A first terminal N7 of the capacitor C4 is connected to a node N2, and a second terminal N8 is connected to the output node N10 by the switch SW8. The capacitive pressure sensor C is connected between the nodes N7 and N6.

In switch phase B, the first terminal N1 of the capacitor C1 is switched to the AGND by the switch SW2, and the second terminal N2 of the capacitor C1 is switched to the AGND by the switch SW3. The first terminal of the capacitor C2 is connected to the node N1, and the second terminal N3 is switched to the node N5 by the switch SW6. The first terminal of the capacitor C0 is connected to the node N3, and the second terminal N6 is connected to the AGND by the switch SW7. The first terminal N4 of the capacitor C3 is connected to the node N5, and the second terminal N9 is connected to the output N10. The first terminal N7 of the capacitor C4 is connected to the node N2, and the second terminal N8 is connected to the AGND by the switch SW7.

Next it is shown how the steady-state output voltage VOUTB in clock phase B as a function of the sensor capacitance C realizes the function of Equation 3. All voltages are referred to as AGND. The operational amplifier is assumed to be ideal such that the inverting input OAINM remains at AGND voltage. When a new clock phase begins, the charges stored in the capacitors during the previous phase are redistributed.

In clock phase A, a charge conservation law formulated at the inverting input of the operational amplifier A1 is $$C1*VIN + C3*(VOUT_A - VOUT_B) + (C4+C)*VOUT_A = 0 \quad (4)$$

In phase B, the charge conservation yields $$C2*(0-VIN) + C3*(VOUT_B - VOUT_A) + C0*(0 - VOUT_A) = 0 \quad (5)$$

The solution from Equations 4 and 5 is $$VOUT_B = \frac{(C3+C4+C)C2 - (C3+C0)C1}{(C3+C4+C)C3 - C3(C3+C0)} \quad (6)$$

$$VIN = \frac{C3 + C4\frac{(C3+C0)C1}{C2} + C}{\frac{-(C0-C4)C3}{C2} + \frac{C3}{C2}C} VIN$$

The dc gain in phase B is $$G = \frac{VOUT_B}{VIN} \quad (7)$$

$$= \frac{C3 + C4\frac{(C3+C0)C1}{C2} + C}{\frac{-(C0-C4)C3}{C2} + \frac{C3}{C2}C}$$

$$= \frac{K_1 + C}{K_2 + K_3 C}.$$

The dependency of dc gain G on sensor capacitance C is of the same type in Equations 3 and 7, which proofs that the gain in phase B can implement the required linearization function of Equation 3.

To calculate the values for the adjustable capacitors C0, C1 and C3, a linear gain-pressure relationship must first be defined:

$$G(p) = G_1 p - G_0 \quad (8)$$

and some values for coefficients $G_1$ and $G_0$ must be fixed.

The sensor capacitance C solved from Equation 7 gives $$C = \frac{K_2 G - K_1}{1 - K_3 G}. \quad (9)$$

Combining Equations 8 and 9 we have $$C(p) = \frac{K_2 G_1 p - K_2 G_0 - K_1}{1 - K_3 G_1 p + K_3 G_0} \quad (10)$$

$$= \frac{\frac{K_2}{K_3} p - \frac{K_2 G_0 + K_1}{K_3 G_1}}{\frac{1 + K_3 G_0}{K_3 G_1} - p}.$$

Equation 2 is here rewritten in another form:

$$C(p) = C_{00} + \frac{C_0 p_0}{p_0 - p} \quad (11)$$

$$= \frac{C_{00} p_0 + C_0 p_0 - C_{00} p}{p_0 - p}.$$

Assuming that the sensor parameters $C_{00}$, $C_0$ and $p_0$ are known, we can calculate $K_1$, $K_2$ and $K_3$ from Equations 10 and 11 as follows:

$$\frac{1 + K_3 G_0}{K_3 G_1} = p_0 \Rightarrow K_3 \quad (12)$$

$$= \frac{1}{G_1 \left(p_0 - \frac{G_0}{G_1}\right)}$$

$$= \frac{1}{G_1 p_0 - G_0}$$

$$K_2 = K_3(-C_{00}) \quad (13)$$

$$= -\frac{C_{00}}{G_1 p_0 - G_0}$$

-continued $$-\frac{K_2G_0 + K_1}{K_3G_1} = C_{00}p_0 + C_0p_0 \Rightarrow K_1 \quad (14)$$

$$= -(C_{00} + C_0)p_0K_3G_1 - K_2G_0$$

$$= \frac{-(C_{00} + C_0)p_0G_1 + C_{00}G_0}{G_1p_0 - G_0}$$

$$= -C_{00} - C_0 - \frac{G_0C_0}{G_1p_0 - G_0}.$$

Now the adjustable capacitor values from Equation 7 are:

$$C3 = K_3C2 \quad (15)$$

$$C0 = C4 - K_2\frac{C2}{C3} = C4 - \frac{K_2}{K_3} \quad (16)$$

$$C1 = \frac{(C3 + C4 - K_1)C2}{C3 + C0}. \quad (17)$$

In practice, the circuit in FIG. 2 may suffer from offset voltage of the operational amplifier A1. Due to the offset, the voltage at the node OAINM differs from the AGND voltage, adding an unwanted component to the output voltage VOUT.

Figure 4:
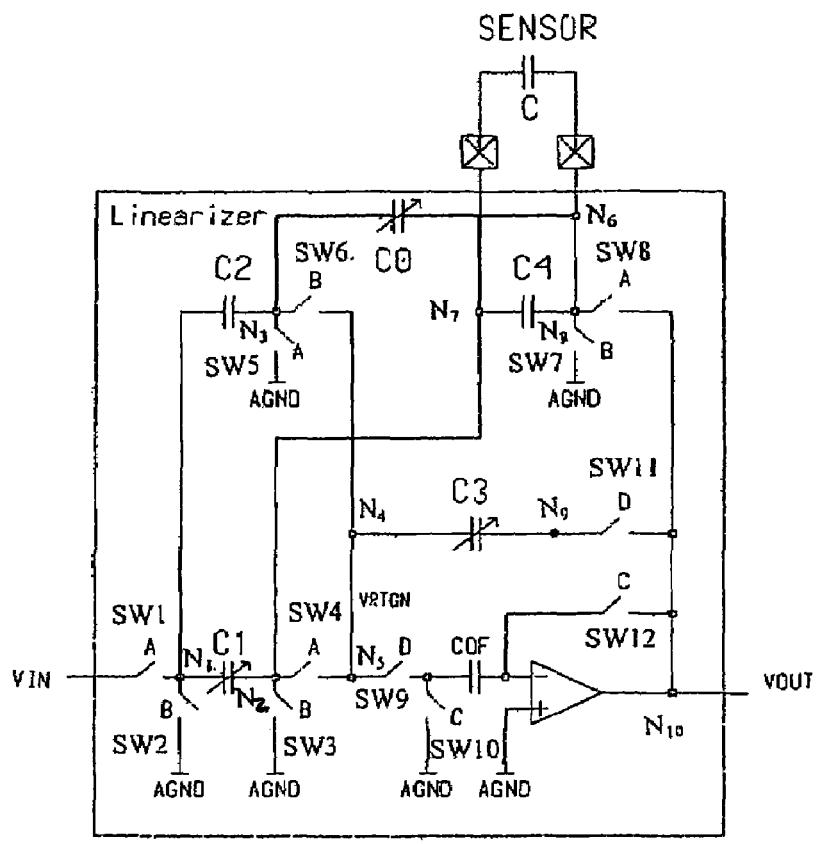
FIG. 4 is a schematic diagram of another circuit according to the present invention.
Figure 5:
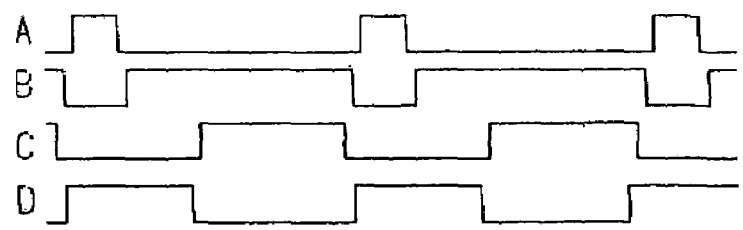
FIG. 5 is a timing diagram showing waveforms of switch control signals A, B, C and D.

One possible approach to cancel the offset is presented in FIG. 4. The basic circuit is similar to the circuit shown in FIG. 2, and therefore only differences are described below. An example of timing for clock signals A, B, C and D is shown in FIG. 5. Signals A and B are similar to those shown in FIGS. 2 and 3. Signals C and D are non-overlapping signals, i.e. they are never active at the same time. Signal D becomes active before the clock phase A begins but does not become inactive until a predetermined first portion of the clock phase B expires. Signal C is active for the remaining portion of the clock phase B up to the next clock phase A. From now on, the times when D is high are called "clock phase D" and the times when C is high are called "clock phase C".

One terminal of an offset cancellation capacitor COF is connected at the inverting input of the operational amplifier A1. The other terminal N11 is switched to the node N5 by means of a switch SW9 in the clock phase D, and to the analog ground AGND by means of a switch SW10 in the clock phase C. A switch SW11 is provided between the second terminal N9 of the capacitor C3 and the output node N10 such that the capacitor C3 is switched to the output node N10 in the clock phase D. A switch SW12 is provided between the inverting input and the output of the amplifier A1 such that the input and output are shortcut in the clock phase C. As a result, the capacitor COF stores the offset voltage in the clock phase C. The other capacitors keep their previous voltages. In the clock phase D, the capacitor COF keeps the potential of the node N5 (virtual ground node VRTGN) at the AGND potential, thereby cancelling the offset.

The switches SW1 to SW12 for the switched capacitor operation can be implemented using various semiconductor switch technologies. In such a case, the switches are realized with metal-oxide-semiconductor (MOS) transistors, and they may cause errors to the capacitor voltages due to a phenomenon called charge injection. When a MOS transistor is turned on, a charge is generated in its channel. This charge is injected from surrounding nodes, possibly changing the capacitor voltages in the circuit of FIG. 2 or 4. When the transistor is turned off, the charge is injected out of the transistor.

In an embodiment of the invention, charge injection errors are decreased by means of dummy switches, which receive charges coming from other switches and which can be added to any nodes in the circuits above, wherever necessary.

Figure 6:
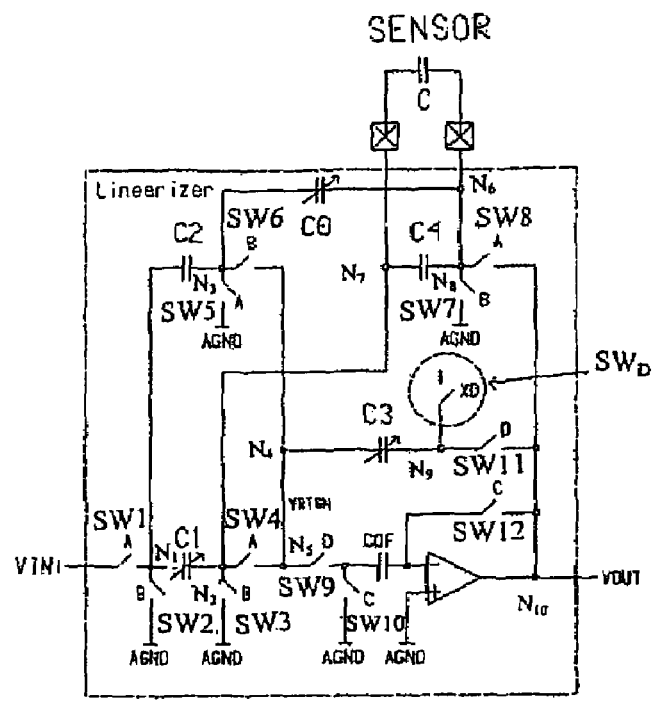
FIGS. 6 and 7 are schematic diagrams of still further circuits according to the present invention.
Figure 7:
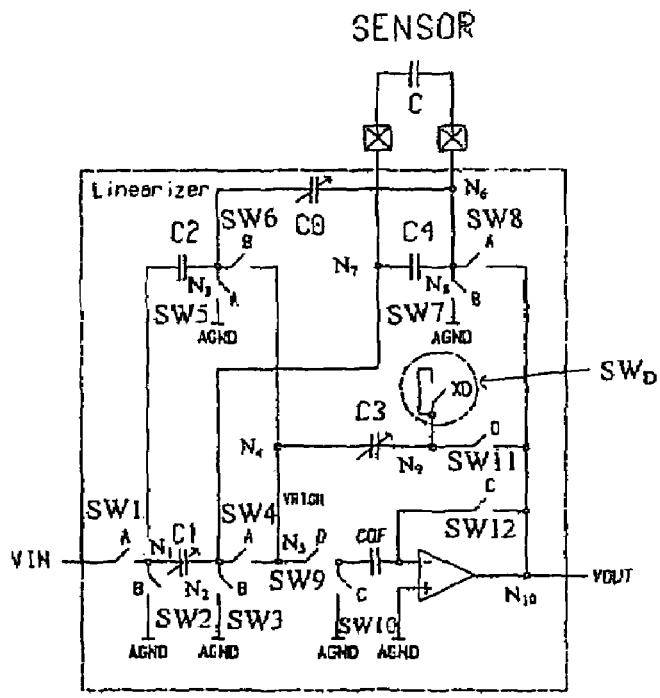

FIGS. 6 and 7 show examples of a dummy switch $SW_D$ connected, on the right side of the capacitor C3, to a node N9 in order to cancel the errors caused by the neighboring switch SW11 to the voltage of the capacitor C3. In FIG. 6, the dummy switch $SW_D$ is left open at the other end. In FIG. 7, the dummy switch $SW_D$ is shorted at both ends. Both of these configurations may be used, but they may require different transistor sizing. In both cases, the dummy switch $SW_D$ is a controlled signal XD which is the complement of signal D controlling the switch SW11. Similarly, a dummy switch can be added to any circuit node to cancel errors caused by a neighboring switch.

The circuits presented above are only examples, and various modifications and changes can be made. For example, the circuits may be simplified by removing the capacitor C4, as it is just parallel to the capacitive pressure sensor C, but at the expense of less freedom to select values for the capacitors C0, C1 and C3. As another example, the operational amplifier A1 can also be an operational transconductance (OTA) amplifier. The invention and its embodiments are not limited to the examples described above but may vary within the scope of the claims.

The invention claimed is:

1. A linearizer circuit for a capacitive pressure sensor, comprising:
    an operational amplifier, and
    a feedback network of switched capacitor type controlled by clock phases between a first switching phase and a second switching phase so that dc gain of the operational amplifier configuration from a switching capacitor configuration in the second switching phase is adapted to realize a linearization function required to substantially linearize a non-linear capacitance-pressure characteristic of a capacitive pressure sensor when the capacitive pressure sensor is connected to be part of the feedback network.

2. A linearizer circuit according to claim 1, wherein the feedback network of switched capacitor type includes adjustable capacitors for adapting the linearizer circuit to parametric variations among different capacitive pressure sensors.

3. A linearizer circuit according to claim 2, wherein the feedback network of switched capacitor type comprises
    a first capacitor having a first terminal switched to an input voltage in the first switching phase or to an analog ground in the second switching phase, and a second terminal switched to an inverting input of the operational amplifier in the first switching phase and to the analog ground in the second switching phase,
    a second capacitor having a first terminal connected to the first terminal of the first switched capacitor, and a second terminal switched to the analog ground in the first switching phase and to the inverting input of the operational amplifier in the second switching phase,
    a third capacitor having a first terminal connected to the inverting input of the operational amplifier, and a second terminal connected to or switched to an output of the operational amplifier at least in the first switching phase, and
    a fourth capacitor having a first terminal connected to the second terminal of the second capacitor, and a second terminal switched to the output of the operational amplifier in the first switching phase and to the analog ground in the second switching phase, wherein the capacitive pressure sensor is to be connected between the second terminal of the first capacitor and the second terminal of the fourth capacitor.

4. A linearizer circuit according to claim 2, wherein said operational amplifier comprises an operational transconductance amplifier.

5. A linearizer circuit according to claim 1, wherein the feedback network of switched capacitor type comprises:

a first capacitor having a first terminal switched to an input voltage in the first switching phase or to an analog ground in the second switching phase, and a second terminal switched to an inverting input of the operational amplifier in the first switching phase and to the analog ground in the second switching phase, a second capacitor having a first terminal connected to the first terminal of the first switched capacitor, and a second terminal switched to the analog ground in the first switching phase and to the inverting input of the operational amplifier in the second switching phase, a third capacitor having a first terminal connected to the inverting input of the operational amplifier, and a second terminal connected to or switched to an output of the operational amplifier at least in the first switching phase, and a fourth capacitor having a first terminal connected to the second terminal of the second capacitor, and a second terminal switched to the output of the operational amplifier in the first switching phase and to the analog ground in the second switching phase, wherein the capacitive pressure sensor is to be connected between the second terminal of the first capacitor and the second terminal of the fourth capacitor.

6. A linearizer circuit according to claim 5, further comprising an offset cancellation device including an offset cancellation capacitor switched between the inverting input of the operational amplifier and the analog ground during at least an end portion of the second switching phase, and switched between the inverting input of the operational amplifier and the second terminal of the first capacitor in the first switching phase, and switched between the inverting input of the operational amplifier and the second terminal of the second capacitor during the leading portion of the second switching phase, a switch configured to switch the second terminal of the third capacitor to the output of the operational amplifier in the first switching phase and during a leading portion of the second switching phase, and a switch configured to switch the inverting input to the output of the operational amplifier during an end portion of the second switching phase.

7. A linearizer circuit according to claim 6, comprising at least one dummy switch connected to a switched terminal of at least one of said first, second, third and fourth capacitors and controlled by a clock which is a complement of a clock used for switching the respective switched terminal, said dummy being adapted to receive any charge injection from a surrounding circuitry.

8. A linearizer circuit according to claim 6, wherein said operational amplifier comprises an operational transconductance amplifier.

9. A linearizer circuit according to claim 5, comprising at least one dummy switch connected to a switched terminal of at least one of said first, second, third and fourth capacitors and controlled by a clock which is a complement of a clock used for switching the respective switched terminal, said dummy being adapted to receive any charge injection from a surrounding circuitry.

10. A linearizer circuit according to claim 9, wherein another end of the at least one dummy switch is open-ended or shorted to the switched terminal.

11. A linearizer circuit according to claim 10, wherein said operational amplifier comprises an operational transconductance amplifier.

12. A linearizer circuit according to claim 9, wherein said operational amplifier comprises an operational transconductance amplifier.

13. A linearizer circuit according to claim 5, wherein said operational amplifier comprises an operational transconductance amplifier.

14. A linearizer circuit according to claim 1, wherein said operational amplifier comprises an operational transconductance amplifier.

* * * * *